United States Patent
Taylor

[15] 3,670,009
[45] June 13, 1972

[54] AMMOXIDATION OF SATURATED HYDROCARBONS

[72] Inventor: Keith M. Taylor, Ballwin, Mo.
[73] Assignee: Monsanto Company, St. Louis, Mo.
[22] Filed: Dec. 21, 1970
[21] Appl. No.: 100,548

Related U.S. Application Data

[63] Continuation-in-part of Ser. No. 788,084, Dec. 30, 1968, abandoned.

[52] U.S. Cl............................................................260/465.3
[51] Int. Cl..............................................................C07c 121/02
[58] Field of Search................................................260/465.3

[56] References Cited

UNITED STATES PATENTS

| | | | |
|---|---|---|---|
| 3,118,928 | 1/1964 | Garrison, Jr. | 260/465.3 |
| 3,142,697 | 7/1964 | Jennings et al. | 260/465.3 |
| 3,161,670 | 12/1964 | Adams et al. | 260/465.3 |
| 3,365,482 | 1/1968 | Khoobiar | 260/465.3 |
| 3,433,823 | 3/1969 | McMahon | 260/465.3 |

*Primary Examiner*—Joseph P. Brust
*Attorney*—Paul L. Passley, Richard W. Sternberg and Neal E. Willis

[57] ABSTRACT

Method for the production of acrylonitrile or methacrylonitrile from propane or isobutane employing a catalyst containing the oxides of molybdenum, boron and tin.

4 Claims, No Drawings

AMMOXIDATION OF SATURATED HYDROCARBONS

This application is a continuation-in-part of copending application, Ser. No. 788,084 filed Dec. 30, 1968, now abandoned.

BACKGROUND OF THE INVENTION

This invention relates to the ammoxidation of saturated hydrocarbons to form unsaturated nitriles, particularly alpha, beta-ethylenically unsaturated mono-nitriles.

The value of alpha, beta-unsaturated nitriles is generally well recognized with acrylonitrile being among the most valuable monomers available to the polymer industry for producing useful polymeric products. Acrylonitrile is useful in the preparation of synthetic fibers, synthetic rubbers and other useful plastic products.

Many processes, catalytic and non-catalytic, are known and practiced for the manufacture of alpha, beta-unsaturated nitriles. A generally practiced catalytic ammoxidation process comprises reacting an olefin with ammonia and oxygen in the vapor phase in the presence of a catalyst. For the production of acrylonitrile, propylene is the generally used olefin reactant.

Propane is a source of carbon which is lower in cost than propylene or any other material useful as a starting material in the manufacture of acrylonitrile. Therefore, it is readily recognized that a feasible process for producing acrylonitrile directly from propane would be highly desirable.

Although some art has developed on the ammoxidation of propane to form acrylonitrile, a commercially feasible process has not heretofore been reported because the ultimate yield of acrylonitrile obtained from propane is relatively low. For example, U.S. Pat. No. 3,365,482 discloses the use of molybdenum oxide or tungsten oxide as catalysts for the conversion of propane to acrylonitrile. However, it is observed from this reference that the ultimate yield of acrylonitrile, based on propane converted, is low. As discussed in this patent and clearly recognized in the art, many catalysts are known which with comparative ease effect the ammoxidation of olefins to form alpha, beta-unsaturated nitriles; but that, unfortunately, saturated hydrocarbons do not have a reactivity comparable to unsaturated hydrocarbons to form alpha, beta-unsaturated nitriles.

SUMMARY

This invention is directed to a vapor phase process wherein at least one saturated hydrocarbon, ammonia and oxygen are contacted in the presence of a catalyst containing molybdenum, boron and tin under reaction conditions which produce unsaturated nitriles, particularly, at least in part, alpha, beta-ethylenically unsaturated mono-nitriles. Particularly, this invention is useful in converting propane to acrylonitrile and isobutane to methacrylonitrile.

Accordingly, typical objects of this invention are to provide: (1) an improved vapor phase process for the production of unsaturated nitriles, (2) a vapor phase ammoxidation process for converting saturated hydrocarbons directly to unsaturated nitriles, (3) vapor phase ammoxidation processes for the production of acrylonitrile directly from propane and methacrylonitrile directly from isobutane and, (4) a catalyst useful in the ammoxidation of saturated hydrocarbons.

Other objects, aspects and advantages of this invention will become apparent to those skilled in the art upon further study of this disclosure and the appended claims.

In accordance with this invention, in one aspect, unsaturated nitriles are prepared from saturated hydrocarbons in a one step vapor phase process comprising contacting at least one saturated hydrocarbon, ammonia and oxygen in the presence of a catalyst containing, as the essential catalytic ingredients, molybdenum, boron and tin under conditions suitable for converting the selected saturated hydrocarbon to the desired unsaturated nitrile.

Any saturated hydrocarbon capable of forming unsaturated nitriles may be used in the practice of the invention. The saturated hydrocarbons may contain three to 12 carbon atoms per molecule and may be straight chained or branched.

Basically, the applicable saturated hydrocarbons have up to 12 carbon atoms per molecule and may be represented by the formula:

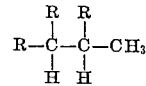

wherein R is hydrogen or a saturated monovalent organic hydrocarbon radical. Examples of useful saturated hydrocarbons are propane, butane, isobutane, pentane, isopentane, hexane, isohexane, 3-methyl pentane, dimethylpentane, 2,3-dimethyl butane, heptane, isoheptane, octane, isononane, dodecane, and the like.

One or more saturated hydrocarbons may be employed in the process at any one time. The saturated hydrocarbons employed should be substantially free of unsaturated hydrocarbons for best conversion and optimum yield of the desired unsaturated nitrile. The present invention is, therefore, not to be confused with the developed art directed to olefin ammoxidation processes which unanimously teach that saturated hydrocarbons in the olefin feed are inert to the reaction and apparently serve as a diluent.

While ammonia is most generally employed, other materials may be employed. For example, ammonia may be generated in use from decomposable ammonium compounds such as ammonium carbonate, or from various amines, such as methyl amine, ethyl amine and aniline. Any source of oxygen, pure or in admixture with inerts, may be employed in the process of this invention. Air is a satisfactory source of oxygen for use in this invention. The molar ratio of the saturated hydrocarbon:ammonia:oxygen employed in the process of this invention, will generally be in the range of 1:0.5:0.5 to 1:6:8 and preferably in the range of 1:1:1.5 to 1:3:4.

The catalyst used in the process of this invention may comprise (i) a mixture of the oxides of molybdenum, boron and tin and/or (ii) a compound or complex of oxygen, molybdenum, boron and tin.

The quantities of the metals employed in the catalysts of this invention effective in the conversion of saturated hydrocarbons to alpha, beta-unsaturated nitriles are generally within the weight ratio range defined as stannic oxide to molybdenum oxide of 10:1 to 1:10, preferably 2:1 to 1:2 and boron oxide to molybdenum oxide of 1:2 to 1:50, preferably 1:2 to 1:10, although weight ratios of the metals outside of these ranges can be used. Also, the metals will to some extent be present in the form of a tin salt of boromolybdic acid. The catalyst can be employed with or without a support. When used with a support, preferably the support comprises 10 to 90 percent by weight of the catalyst. Any known support materials can be used, such as, for example, silica, alumina, zirconia, alundum, silicon carbide, alumina-silica, pumice and the inorganic phosphates, silicates, aluminates, borates and carbonates, stable under the reaction conditions encountered in the process in which the catalyst is used.

The metal components can be formed separately and then blended or formed separately or together in situ. As starting materials for the molybdenum component, for example, there can be used molybdic acid, ammonium molybdate, molybdenum oxide, and the like. The tin component can be provided in the form of tin oxide, tin phosphate or by precipitation in situ from a soluble tin salt such as stannous chloride, stannic chloride, or stannous acetate. Tin metal can be used as a starting material and converted to the oxide by oxidation with hot nitric acid. The boron component employed as a starting material generally is boric acid. However, this component can be provided as boron oxide.

A suitable molybdenum, boron and tin catalyst for use in this invention is described in U.S. Pat. No. 3,309,395, which disclosure is hereby incorporated herein by reference.

The activity of the catalyst system is enhanced by heating at an elevated temperature. Preferably the catalyst mixture is dried and heated at a temperature of from about 250° to about 650° C. for from 2 to 24 hours and then calcined at a temperature from about 300° to about 900° C. for from 2 to 8 hours.

As previously stated, the process of this invention is carried out as a vapor phase reaction. Accordingly, any apparatus of the type suitable for carrying out oxidation reactions in the vapor phase may be employed for the practice of the process. The process may be operated continuously or intermittently, and may employ a fixed bed with a large particulate or pelleted catalyst, or a so-called "fluidized" bed of catalyst with finely divided catalyst. The latter type is presently preferred for use with the process of this invention as it permits closer control of the temperature of the reaction.

The process of this invention is carried out at a temperature in the range of about 300° C. and up to about 650° C. Preferably, the reaction is conducted at a temperature in the range of about 350° to about 550° C. When ammoxidizing propane to yield acrylonitrile the preferred operating temperature is in the range of 450° C. to 600° C. and when ammoxidizing isobutane to methacrylonitrile such temperature is in the range of 350° C. to 500° C.

Pressures other than atmospheric may be employed in the process of this invention, however, it will generally be preferred to conduct the reaction at or near atmospheric pressure, since the reaction proceeds well at such pressure and the use of expensive high pressure equipment is avoided.

The contact time between the reactants and catalyst employed in the process of this invention may be selected from a broad operable range which may vary from about 0.1 to about 50 seconds. The contact time may be defined as the length of time in seconds which the unit volume of reactant gases measured under reaction conditions is in contact with the volume of catalyst employed. The optimum contact time will, of course, vary, depending upon the hydrocarbon being reacted, the catalyst and the reaction temperature. In the case of converting propane to acrylonitrile, the contact time will preferably be within the range of 0.5 to 15 seconds.

The reactor employed may be brought to the desired reactor temperature before or after the introduction of the vapors to be reacted. Preferably, the process is conducted in a manner with the unreacted feed materials being recirculated. Also, the activity of the catalyst may be regenerated by contacting the catalyst with air at elevated temperatures.

The products of the reaction may be recovered from the effluent gas by any appropriate method and means known to the art and further elucidation here will be unnecessary duplication of the art.

DESCRIPTION OF PREFERRED EMBODIMENTS

The following examples are given as illustrative of the invention and, as such, specifics presented therein are not intended to be unduly considered limitations upon the scope of this invention.

In the following examples, the reactor used is a concentric tube system fabricated from 96 percent quartz tubing. The inner tube is ½ by 12 inches and the outer tube is 1 inch diameter. The reactor unit is supported in a vertical 1 inch tube furnace. Heat control of the reactor is accomplished by fluidizing Fisher "sea" sand in the shell side of the reactor unit. The reaction temperatures given in the Examples are measured by a thermocouple in the center of the reactor. Prior to entering the reactor, the reactant gases are mixed in standard Swagelock stainless steel "T's" and introduced into the bottom of the reactor through a coarse quartz fritted tube. The effluent gases from the reactor are chromatographically analyzed.

EXAMPLE I

This Example illustrates the preparation of a catalyst having the following composition (weight percent): 16.0 percent of $SnO_2$, 3.7% of $B_2O_3$, 10.7% of $MoO_3$ and 69.6% of $SiO_2$.

A solution is prepared by dissolving 6.6 grams of ammonium molybdate and 3.3 grams of boric acid in 0.05 liter of water. This solution is stirred into 0.15 liter of 25 percent silica sol. While heating and mixing vigorously, 33 ml. of an acetic acid solution of 7.5 grams of stannous oxide is allowed to flow into the ammonium molybdate-boric acid-silica sol solution. The mixture is evaporated to a pasty consistency and dried at 150° C. The dried catalyst is then calcined under air at 500° C. for 12 hours.

EXAMPLE II

This example illustrates the utility of the catalyst as prepared in the preceding example for converting propane directly to acrylonitrile.

The feed to the reactor consists of propane, ammonia and air. The volume ratio of propane:ammonia is 1:1.2 and propane: air is 1:12. The quantity of catalyst employed is 4.8 grams. The variables of reaction temperature and contact time are shown in the following table which also gives the results of the reaction.

TABLE

| Contact time (sec.) | Reactor temp. (° C.) | Propane [1] conversion, percent | Acrylonitrile | |
|---|---|---|---|---|
| | | | Single pass [2] yield, percent | Ultimate [3] yield, percent |
| 5.0 | 500 | 30.7 | 4.7 | 15.2 |
| 10.0 | | 39.7 | 6.5 | 16.5 |
| 1.0 | 550 | 32.0 | 11.4 | 35.3 |
| 2.5 | | 42.0 | 13.5 | 32.2 |
| 3.0 | | 45.0 | 13.8 | 30.8 |
| 4.0 | | 51.0 | 10.2 | 20.0 |
| 1.0 | 600 | 37.3 | 11.1 | 29.9 |

[1] Propane conversion percent=mols propane in feed, mols propane in effluent×100 mols propane in feed.
[2] Acrylonitrile single pass yield percent=mols acrylonitrile in effluent× 100 mols propane in feed.
[3] Acrylonitrile ultimate yield, percent=acrylonitrile single pass yield, percent×100 propane conversion, percent.

EXAMPLE III

Example II is repeated except that isobutane is used as the saturated hydrocarbon instead of propane and temperatures of 375° C., 425° C., 475° C., and 525° C., are employed. Contact times are 4, 8 and 16 seconds. Methacrylonitrile is obtained.

Production of the catalyst is by conventional methods, for example by impregnating the carrier with suitable solutions of tin-boron-molybdenum salts and subsequent drying, by coprecipitation of silica gel and the tin bromolybdate and subsequent drying, or by applying the tin salt of boromolybdic acid in molten form, advantageously in the presence of a flux such as urea or oxalic acid, for example in a fluidized bed at a temperature of about 100° to 400° C. Solutions of tin chloride or tin acetate, boric acid and molybdic acid or ammonium molybdate, are for example suitable for the production of the solutions used for impregnation or for the production of the precipitated catalysts.

It will be obvious to persons skilled in the art that various modifications may be made in the improved catalyst and process as described in this application. Accordingly, it is intended that all such modifications which reasonably fall within the scope of the appended claims are included herein.

I claim:

1. A process for the preparation of acrylonitrile or methacrylonitrile which comprises reacting in the vapor phase at a temperature of from about 300° C, to about 650° C, a hydrocarbon consisting essentially of propane or isobutane, ammonia and oxygen in the presence of a catalyst consisting essentially of the oxides of the elements molybdenum, boron and tin in a weight ratio of stannic oxide:molybdenum oxide of from 10:1 to 1:10 and boron oxide to molybdenum oxide of 1:2 to 1:50; the molar ratio of hydrocarbon to ammonia to oxygen being from about 1:0.5:0.5 to about 1:6:8.

2. The process of claim 1 wherein said catalyst is supported on silica.

3. The process of claim 1 wherein acrylonitrile is produced, said hydrocarbon is propane and said temperature is from about 450° C. to about 600° C.

4. The process of claim 1 wherein methacrylonitrile is produced, said hydrocarbon is isobutane and said temperature is from about 350° C. to about 500° C.

* * * * *